United States Patent
Prokopenya et al.

(10) Patent No.: US 10,289,899 B2
(45) Date of Patent: May 14, 2019

(54) COMPUTER-IMPLEMENTED METHODS AND COMPUTER SYSTEMS FOR REAL-TIME DETECTION OF HUMAN'S EMOTIONS FROM VISUAL RECORDINGS

(71) Applicant: Banuba Limited, Wan Chai (HK)

(72) Inventors: Viktor Prokopenya, London (GB); Yury Hushchyn, Vilnius (LT); Aliaksei Sakolski, Minsk (BY); Dzmitry Kachatkou, Minsk (BY); Viachaslau Arkhipau, Minsk (BY)

(73) Assignee: Banuba Limited, Wan Chai (HK)

( * ) Notice: Subject to any disclaimer, the term of this patent is extended or adjusted under 35 U.S.C. 154(b) by 0 days.

(21) Appl. No.: 16/119,056

(22) Filed: Aug. 31, 2018

(65) Prior Publication Data

US 2019/0065835 A1 Feb. 28, 2019

Related U.S. Application Data

(60) Provisional application No. 62/552,961, filed on Aug. 31, 2017.

(51) Int. Cl.
*G06K 9/00* (2006.01)
*G06T 17/00* (2006.01)

(52) U.S. Cl.
CPC ..... *G06K 9/00302* (2013.01); *G06K 9/00201* (2013.01); *G06K 9/00248* (2013.01);
(Continued)

(58) Field of Classification Search
CPC ........... G06K 9/00302; G06K 9/00248; G06K 9/00201; G06K 9/00281; G06K 9/00268;
(Continued)

(56) References Cited

U.S. PATENT DOCUMENTS

| | | | | |
|---|---|---|---|---|
| 5,842,194 A | * | 11/1998 | Arbuckle | G06K 9/6857 706/52 |
| 5,850,470 A | * | 12/1998 | Kung | G06K 9/00241 382/157 |

(Continued)

FOREIGN PATENT DOCUMENTS

| CN | 101777116 A | 7/2010 |
|---|---|---|
| CN | 106778468 A | 5/2017 |

OTHER PUBLICATIONS

International Search Report and Written Opinion from International Application No. PCT/IB2018/001252 dated Mar. 19, 2019.

*Primary Examiner* — Manav Seth
(74) *Attorney, Agent, or Firm* — Greenberg Traurig, LLP

(57) ABSTRACT

In some embodiments, the present invention provides for an exemplary system that may include at least the following components: a camera component, where the camera component is configured to acquire a visual input, where the visual input includes a face of a person; a processor configured to: obtain the visual input; apply a face detection algorithm to detect a presence of the face within the visual input; extract a vector of at least one feature of the face; match the vector to a stored profile of the person to identify the person; fit, based on person-specific meta-parameters, a three-dimensional morphable face model (3DMFM) to obtain a person-specific 3DMFM of the ne person; apply a facial expression detection algorithm to the person-specific 3DMFM to determine a person-specific facial expression; and cause to perform at least one activity associated with the person based at least in part on the person-specific facial expression of the person.

**22 Claims, 10 Drawing Sheets
(1 of 10 Drawing Sheet(s) Filed in Color)**

(52) U.S. Cl.
CPC ..... *G06K 9/00268* (2013.01); *G06K 9/00288* (2013.01); *G06T 17/00* (2013.01); *G06T 2200/08* (2013.01); *G06T 2207/30201* (2013.01)

(58) Field of Classification Search
CPC ........... G06K 9/00288; G06K 9/00228; G06K 9/00275; G06K 9/6206; G06K 9/00221; G06K 9/00315; G06T 2207/30201; G06T 17/00; G06T 2200/08
See application file for complete search history.

(56) References Cited

U.S. PATENT DOCUMENTS

| | | | | |
|---|---|---|---|---|
| 6,044,168 A * | 3/2000 | Tuceryan | ........... | G06K 9/00221 345/582 |
| 6,381,346 B1 * | 4/2002 | Eraslan | .............. | G06K 9/00221 345/420 |
| 6,496,594 B1 * | 12/2002 | Prokoski | .............. | A61B 5/1176 382/118 |
| 6,556,196 B1 * | 4/2003 | Blanz | ................. | G06K 9/00275 345/419 |
| 6,654,018 B1 * | 11/2003 | Cosatto | ................... | G10L 13/08 345/473 |
| 6,778,252 B2 * | 8/2004 | Moulton | ................ | G03B 31/00 352/12 |
| 6,807,290 B2 * | 10/2004 | Liu | .................... | G06K 9/00201 375/E7.084 |
| 6,919,892 B1 * | 7/2005 | Cheiky | ................... | G06T 13/40 345/473 |
| 6,934,406 B1 * | 8/2005 | Nakano | ............. | G06K 9/00228 382/118 |
| 6,944,319 B1 * | 9/2005 | Huang | ............... | G06K 9/00288 382/118 |
| 6,944,320 B2 * | 9/2005 | Liu | .................... | G06K 9/00201 345/419 |
| 7,027,054 B1 * | 4/2006 | Cheiky | ................... | G06T 13/40 345/473 |
| 7,103,211 B1 * | 9/2006 | Medioni | ................ | G06T 17/10 382/118 |
| 7,221,809 B2 * | 5/2007 | Geng | ................. | G06K 9/00201 345/419 |
| 7,583,271 B2 * | 9/2009 | Kawakami | ......... | G06K 9/00208 345/582 |
| 8,614,714 B1 * | 12/2013 | Koperwas | ............... | G06T 13/20 345/473 |
| 8,818,034 B2 * | 8/2014 | Zhang | ................. | G06K 9/00221 340/5.52 |
| 2018/0165513 A1 * | 6/2018 | Bhanu | ................ | G06K 9/00288 |

* cited by examiner

COMPUTER-IMPLEMENTED METHODS AND COMPUTER SYSTEMS FOR REAL-TIME DETECTION OF HUMAN'S EMOTIONS FROM VISUAL RECORDINGS

CROSS-REFERENCE TO RELATED APPLICATIONS

This application claims benefit of U.S. provisional patent application Ser. No. 62/552,961 filed Aug. 31, 2017, which is herein incorporated by reference for all purposes.

FIELD OF THE INVENTION

Generally, the present disclosure is directed to computer-implemented methods and computer systems configured for real-time detection of human's emotions from real-time visual recordings.

BACKGROUND

Typically, visual recordings may be continuous recordings recorded during a particular time period by utilizing various video recording devices such as, but not limited to, CCTV cameras, computer cameras associated with desktop computers, computer cameras associated with mobile computers (e.g., tablets, laptops), and/or computer cameras associated with smartphones.

SUMMARY OF THE INVENTION

In some embodiments, the present invention provides for an exemplary computer-implemented method that may include at least the following steps of: obtaining, by at least one processor, a visual input having a face of at least one person; where the visual input includes at least one video frame, at least one image, or both; applying, by the at least one processor, at least one face detection algorithm to detect a presence of the face of the at least one person within the visual input; extracting, by the at least one processor, a vector of at least one feature of the face of the at least one person from the presence of the face within the visual input; matching, by the at least one processor, the vector of the at least one feature of the face of the at least one person to at least one stored profile of the at least one person to identify the at least one person; where the at least one stored profile of the at least one person is stored in at least one profile database having a plurality of profiles of a plurality of persons; where each respective profile of each respective person in the at least one profile database includes each respective plurality of vectors corresponding to each respective plurality of features; fitting, by the at least one processor, based at least in part on a plurality of person-specific meta-parameters, at least one three-dimensional morphable face model (3DMFM) to obtain a person-specific 3DMFM of the at least one person; where the plurality of person-specific meta-parameters corresponds to a particular plurality of vectors corresponding to a particular plurality of features of the at least one person; applying, by the at least one processor, at least one facial expression detection algorithm to the person-specific 3DMFM of the at least one person to determine at least one person-specific facial expression of the at least one person; where the at least one facial expression detection algorithm has been trained to determine a plurality of facial expressions based at least in part on a plurality of predefined categories; and causing, by the at least one processor, to perform at least one activity associated with the at least one person based at least in part on the at least one person-specific facial expression of the at least one person.

In some embodiments, the causing to perform the at least one activity associated with the at least one person further including: associating, by the at least one processor, the at least one person-specific facial expression of the at least one person with at least one element of an electronic content.

In some embodiments, the electronic content is a recommended content that is provided to the at least one person.

In some embodiments, the recommended content is at least one of: i) at least one visual effect, ii) at least one visual mask, or iii) at least one visual filter.

In some embodiments, the exemplary method may further include updating, by the at least one processor, the particular plurality of vectors of the corresponding particular plurality of features in the at least one stored profile of the at least one person based on the person-specific 3DMFM of the at least one person.

In some embodiments, the exemplary method may further include adding at least one new vector of at least one new corresponding feature of the at least one person to the particular plurality of vectors of the corresponding particular plurality of features in the at least one stored profile of the at least one person.

In some embodiments, the exemplary method may further include modifying at least one stored vector of a corresponding particular feature of the at least one person in the at least one stored profile of the at least one person.

In some embodiments, the at least one feature is based on one or more landmarks.

In some embodiments, the plurality of predefined categories is based at least in part on a Facial Action Coding System (FACS).

In some embodiments, the plurality of predefined categories is based at least in part on each respective threshold level for each respective facial expression coefficient of a plurality of facial expression coefficients.

In some embodiments, the visual input has a lower resolution and has been obtained from at least one of: i) at least one CCTV camera, ii) at least one computer camera having a associated with a desktop computer, iii) at least one computer camera associated with at least one mobile computer, or iv) at least one computer camera associated with at least one smartphone.

In some embodiments, the present invention provides for an exemplary system that may include at least the following components: a camera component, where the camera component is configured to acquire a visual input, where the visual input includes a face of at least one person; at least one processor; a non-transitory computer memory, storing a computer program that, when executed by the at least one processor, causes the at least one processor to: obtain the visual input having the face of the at least one person; where the visual input includes at least one video frame, at least one image, or both; apply at least one face detection algorithm to detect a presence of the face of the at least one person within the visual input; extract a vector of at least one feature of the face of the at least one person from the presence of the face within the visual input; match the vector of the at least one feature of the face of the at least one person to at least one stored profile of the at least one person to identify the at least one person; where the at least one stored profile of the at least one person is stored in at least one profile database having a plurality of profiles of a plurality of persons; where each respective profile of each respective person in the at least one profile database includes each respective plurality of vectors corresponding to each respective plurality of features; fit, based at least in part on a plurality of person-specific meta-parameters, at least one three-dimensional morphable face model (3DMFM) to obtain a person-specific 3DMFM of the at least one person; where the plurality of person-specific meta-parameters corresponds to a particular plurality of vectors corresponding to a particular plurality of features of the at least one person; apply at least one facial expression detection algorithm to the person-specific 3DMFM of the at least one person to determine at least one person-specific facial expression of the at least one person; where the at least one facial expression detection algorithm has been trained to determine a plurality of facial expressions based at least in part on a plurality of predefined categories; and cause to perform at least one activity associated with the at least one person based at least in part on the at least one person-specific facial expression of the at least one person.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments. The patent or application file contains at least one drawing executed in color. Copies of this patent or patent application publication with color drawing(s) will be provided by the Office upon request and payment of the necessary fee.

Figure 1:
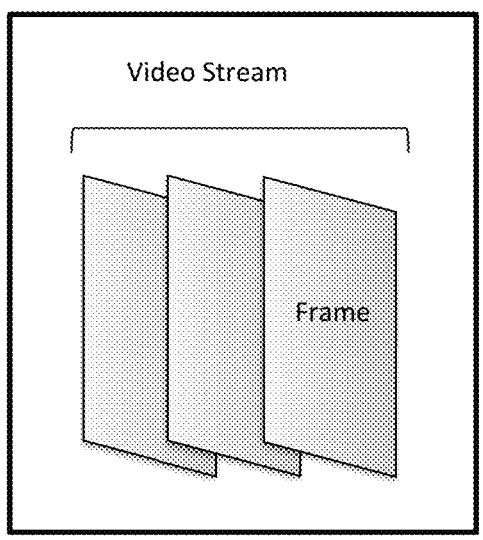
FIGS. 1-9 are representative of some exemplary aspects of the present invention in accordance with at least some principles of at least some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DESCRIPTION OF EXEMPLARY EMBODIMENTS

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention. Further, when a particular feature, structure, or characteristic is described in connection with an implementation, it is submitted that it is within the knowledge of one skilled in the art to effect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, Javascript). The aforementioned examples are, of course, illustrative and not restrictive.

As used herein, the terms "image(s)" and "image data" are used interchangeably to identify data representative of visual content which includes, but not limited to, images encoded in various computer formats (e.g., ".jpg", ".bmp," etc.), streaming video based on various protocols (e.g., Real-time Streaming Protocol (RTSP), Real-time Transport Protocol (RTP), Real-time Transport Control Protocol (RTCP), etc.), recorded/generated non-streaming video of various formats (e.g., ".mov," ".mpg," ".wmv," ".avi," ".flv," ect.), and real-time visual imagery acquired through a camera application on a mobile device.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

As used herein, the term "user" shall have a meaning of at least one user.

In some embodiments, as detailed herein, an exemplary inventive computing device of the present invention may be programmed/configured to process visual feeds from various visual recording devices (such as, without limitations, closed-circuit television cameras (CCTV cameras), mobile-device cameras, computer cameras, or any other cameras of similar purposes) to detect and track (e.g., in real-time) emotions of one or more individuals that appear in visual recording(s) at one time and/or over a period of time. In some embodiments, the exemplary inventive computing device may be configured to be utilized for various goals, such as, without limitation, surveillance, emotion-based recommended electronic content in mobile chats and applications, etc. In some embodiments, exemplary cameras may be either video cameras or digital stills cameras. In some embodiments, the exemplary cameras may be configured to work on the basis of sending analogue and/or digital signals to at least one storage device that may reside within at least one of: a desktop computer, laptop computer, or an output device, such as, without limitation, computer display, a television, and/or a mobile device's screen.

In some embodiments, the exemplary inventive process of detecting and tracking of one or more emotions of one or more individuals over time is agnostic to whether visual recording(s) would have been obtain from the same or different recording devices at the same or different locations.

In some embodiments, the exemplary inventive computing device may be configured to detect and track one or more emotions of one or more individuals over time devices may rely on one or more centralized databases (e.g., data center). For example, the exemplary inventive computing device may be configured to extract feature vector(s) for each face that can be utilized to identify/recognize a particular individual. In some embodiments, the exemplary inventive computing device may be configured to improve the detection by training itself based on a single image for emotion estimation or on a collection of video frames or videos taken in different conditions. In some embodiments, for example in mobile (e.g., smartphone) applications configured/programmed to offer a video communication capability having elements of augmented reality, the exemplary inventive computing device may be configured to detect, in real-time, one or more emotions based at least in part on a single frame or a series of frames without saving a state of recognition and without further improvement of the emotion estimation (for example, based on one or more subsequent frames). In some embodiments, the exemplary inventive process of the present invention may be configured to be utilized within an exemplary inventive recommendation system/engine which may be configured to propose the emotion-specific electronic content based on results of the exemplary inventive detection process of the present invention.

In some embodiments, the exemplary inventive computing device may be configured to utilize one or more techniques to for face recognition and face tracking as detailed herein. In some embodiments, the exemplary inventive computing device may be configured to further utilize techniques that may allow to count number of people in image frames, estimate age and/or gender, and/or perform face matching.

In some embodiments, the exemplary inventive computing device may be configured to assist in security and law enforcement purposes, such as, without limitation, to determine/estimate and track a level of satisfaction of employers or their obsession with problems; to get a feedback about a government performance; tracking patients' moods for medical and preventive purposes (e.g., monitoring stress level, "degree of happiness"); suitable applications in statistics; suitable applications in sociology, etc. In some embodiments, the exemplary inventive computing device may be configured to assist in entertaining or/and educational purposes. For example, exemplary electronic content in mobile and/or computer-based applications may be dynamically adjusted and/or triggered based, at least in part, on the detected emotion(s). In some embodiments, illustrative examples of such dynamically adjusted/triggered electronic content may be one or more of visual masks and/or visual/audio effects (such as aging, changing gender, hairstyle, etc.), which may be applied to users' images in an exemplary video stream. In some embodiments, the illustrative educational content may be dynamically generated by the exemplary inventive computing device and consist of at least one of suggestion(s), fact(s), image(s), etc.

In some embodiments, the exemplary inventive computing device may be configured to utilize raw video input/data from any type of known camera(s), including both analogue and digital ones.

Figure 5:
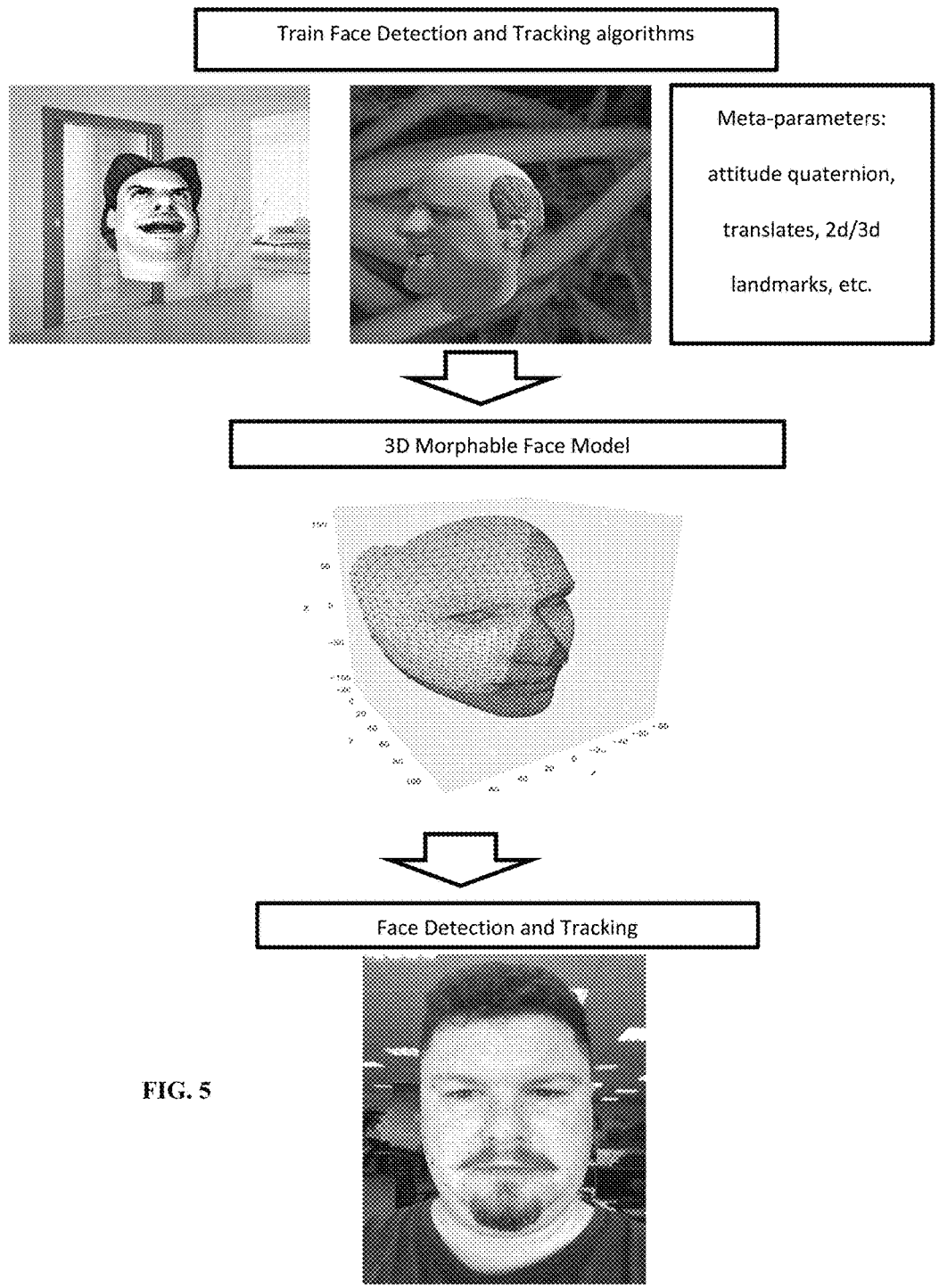
Figure 6:
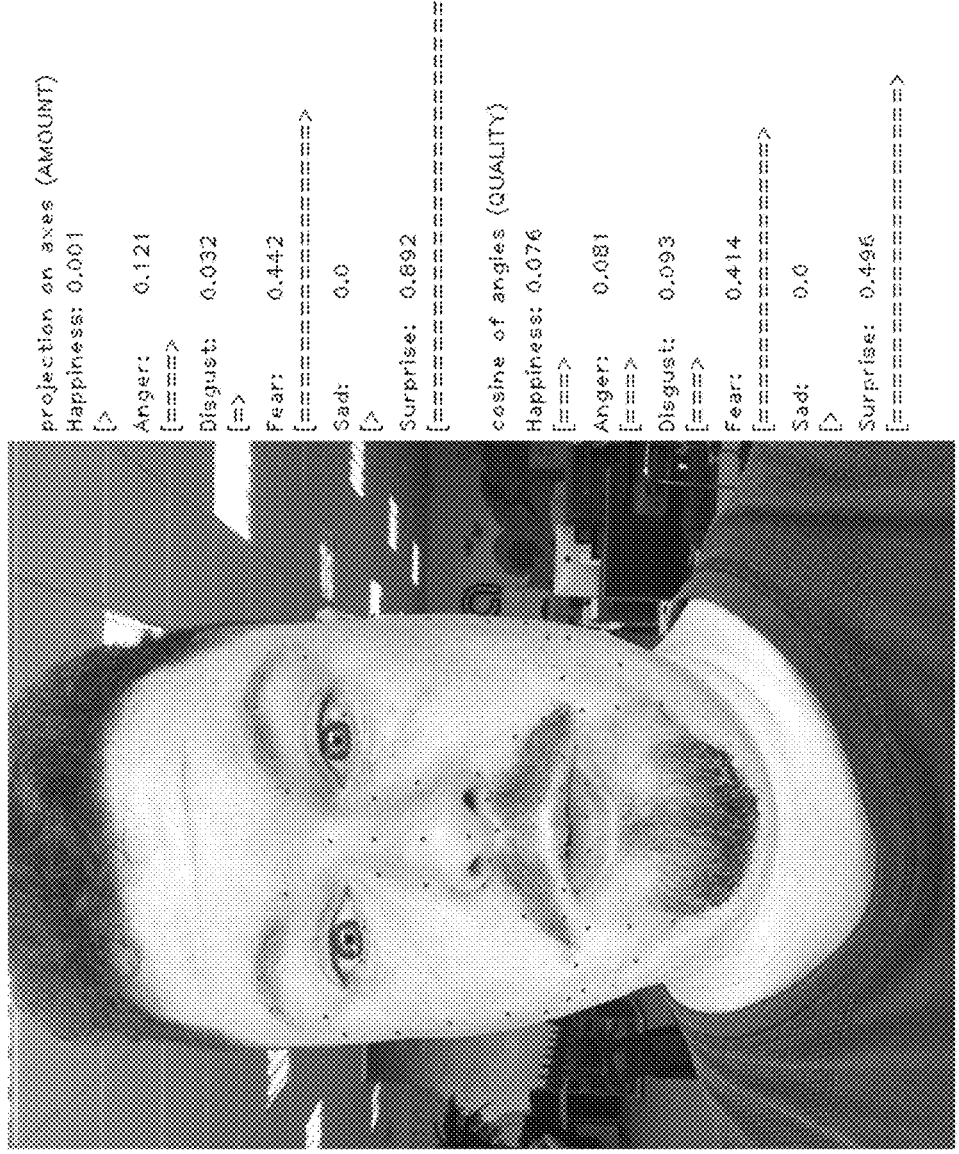
Figure 7:
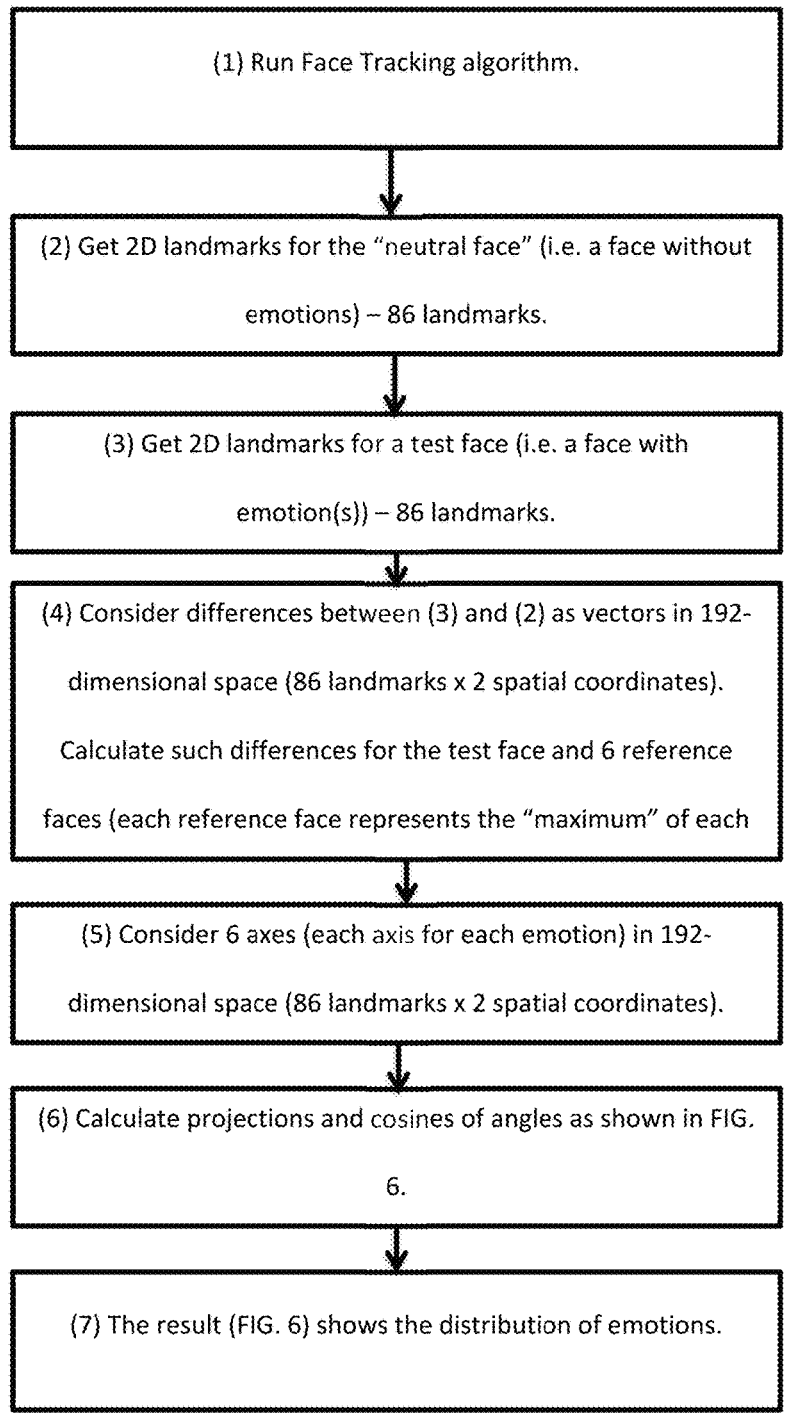
Figure 8:
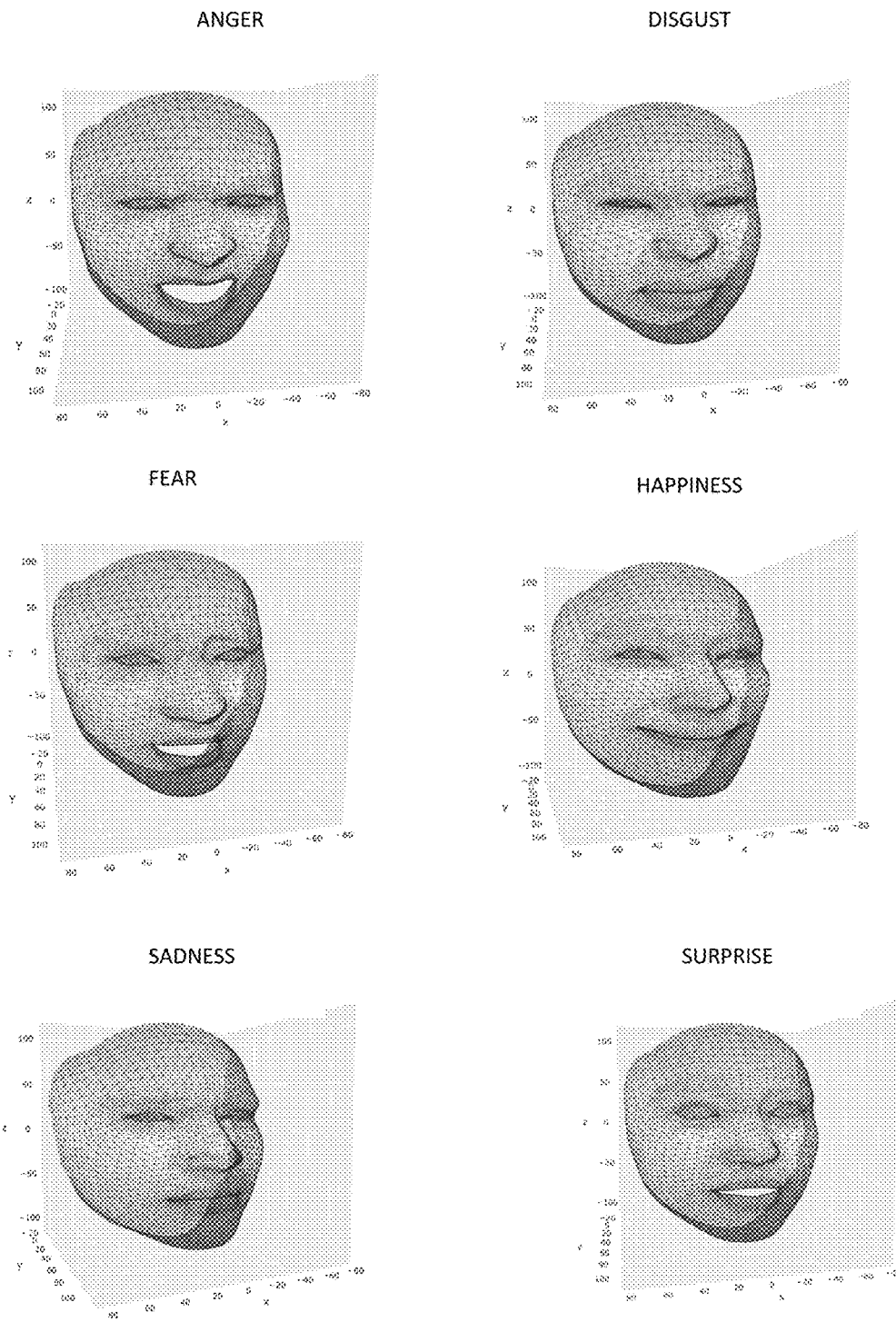

In some embodiments, the exemplary inventive computing device may be configured to utilize morphable three-dimensional face models which may be trained to produce meta-parameters (such as, without limitation, coefficient(s) defining a deviation of a user's head from a mean shape; coefficient(s) defining emotions and/or facial expressions, camera position, and/or head position, etc.). The exemplary workflow for an exemplary inventive process for training an exemplary face recognition algorithm is shown in FIG. 5. For example, refereeing to FIG. 5, the exemplary ranges for meta-parameters used for the training were: roll=[−9.0, 9.0] degrees; tilt=[−65.0, 65.0] degrees; pan=[−70.0, 70.0] degrees; a relative scale=0.4:1.2; translate X=−0.5:5; translate Y=−0.5:5.

In some embodiments, the exemplary inventive computing device may be configured to predict a human emotion based on a single frame as the baseline; while, having several frames may improve quality of detection). In some embodiments, the exemplary inventive computing device may be configured to estimate more refined pattern(s) in facial expression(s), hence utilize lower resolution of cameras (e.g., lower resolution CCTV cameras, lower resolution mobile or web cameras, etc.).

In some embodiments, an exemplary inventive computing device or system may be configured to directly connect to an existing camera (e.g., CCTV, mobile, computer-based, or other) or be operationally and remotely connected. In some embodiments, the exemplary inventive computing device or system may be configured to include a specifically programmed inventive data processing module that may be configured to obtain the video input from one or more cameras. For example, the specifically programmed inventive data processing module may be configured to determine source(s) of input video data, a need to transcode to a different format, or perform any other suitable adjustment to so that video input may be available for processing in accordance with the principles of the present invention. In some embodiments, the input image data (e.g., input video data) may include any appropriate type of source for video contents and may contain various video sources. In some embodiments, the contents from the input video (e.g., the video stream of FIG. 1) may include both video data and metadata. A single picture may also be included in a frame. In some embodiments, the specifically programmed inventive data processing module may be configured to decode, in real-time, the video input and separate into frames. As shown in FIG. 1, an exemplary input video stream captured by the exemplary camera (e.g., a front camera of a mobile personal smartphone) can be divided into frames. For example, a typical movie sequence is an interleaved format of a number of camera shots, and a camera take is a continuous recorded performance with a given camera setup. Camera registration, as used herein, may refer to registration of different cameras capturing video frames in a video sequence/stream. The concept of camera registration is based on the camera takes in reconstruction of video edits. A typical video sequence is an interleaved format of a number of camera shots, and a camera take is a continuous recorded performance with a given camera setup. By registering each camera from the incoming video frames, the original interleaved format can be separated into a number of sequences with each corresponding to a registered camera that is aligned to the original camera setup.

In some embodiments, the specifically programmed inventive data processing module may be configured to process each frame or a series of frames utilizing a suitable face detection algorithm. Some suitable face detection algorithms are detailed in one or more of U.S. patent application Ser. Nos. 15/881,353; 15/956,450; 15/962,347; 15/986,482; 16/015,055; and Ser. No. 16/034,267; whose description is hereby incorporated herein by reference. For example, if one or several faces are detected in the frame, the specifically programmed inventive data processing module may be configured to extract feature vectors and store the extracted information into one or more databases. In some embodiments, the exemplary inventive computing device may be configured to include a specifically programmed inventive person identification module which may be configured to compare the extracted features with previous information stored in the database. In some embodiments, if the specifically programmed inventive person identification module determines a match, then the new information is added to the existing data in order to increase the accuracy of further identification and/or improve the quality of the emotion estimation. In some embodiments, if the corresponding data is missing in the database, a new entry in created. In some embodiments, the resulting emotions may be stored in the database for further analysis.

Figure 2A:
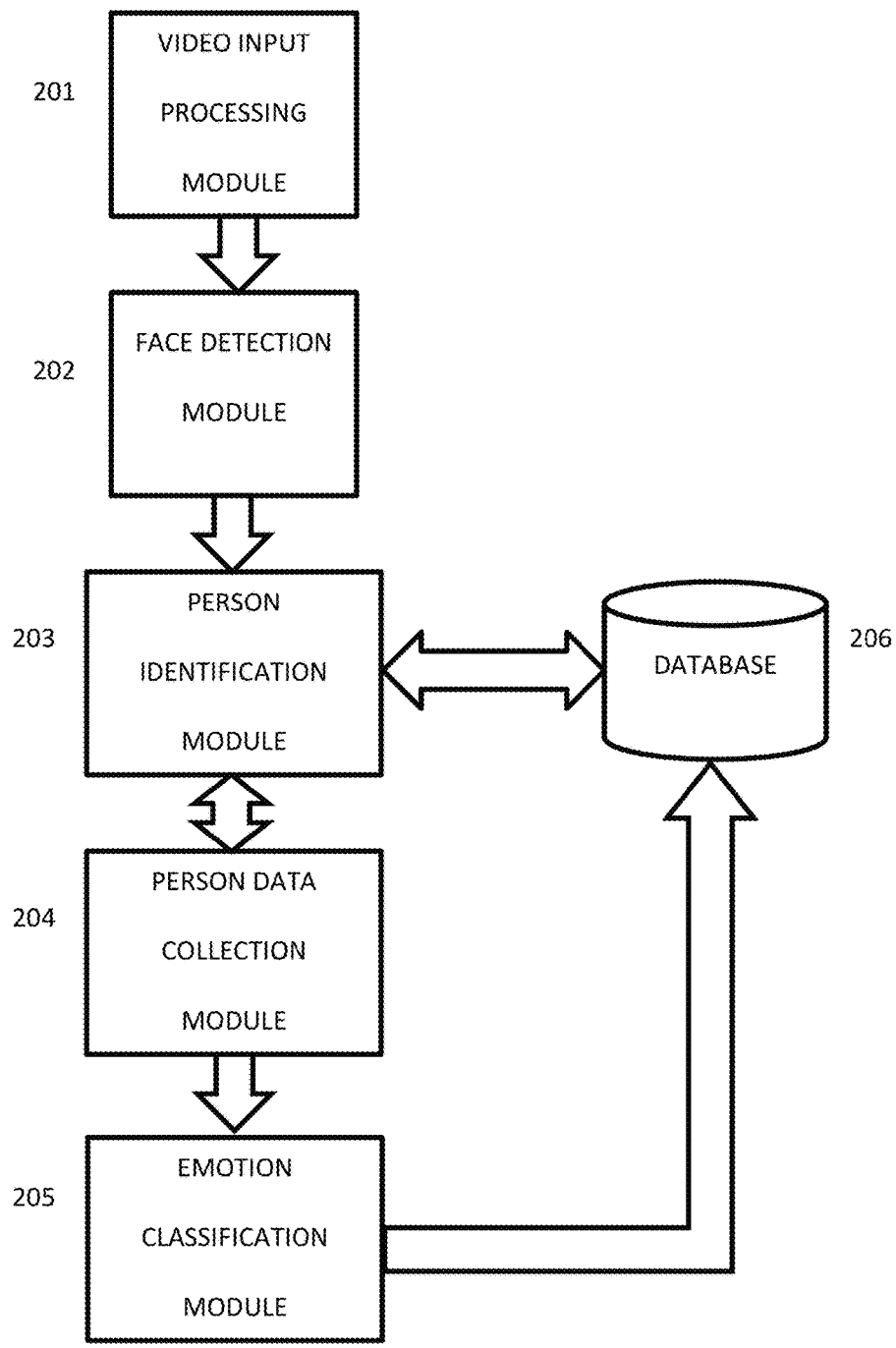
Figure 2B:
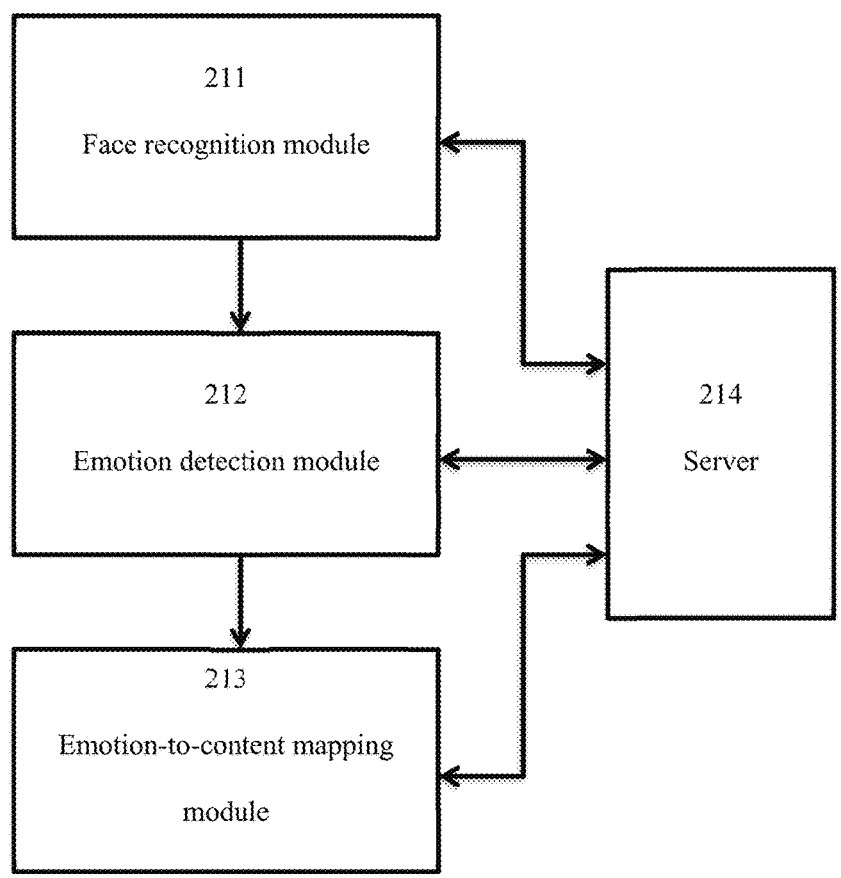

FIGS. 2A and 2B illustrate exemplary structures of the exemplary inventive computing device that may be programmed/configured for emotion detection and recognition in accordance with at least some embodiments of the present invention. For example, referring to FIG. 2A, raw video data from an exemplary camera may be received/obtained by an exemplary specifically programmed inventive Video Input Processing Module (VIPM) (201). In some embodiments, the exemplary inventive VIPM may determine a type of video (e.g., analog or digital) based on the output interface used. For example, the analog interfaces may be SCART, VGA, etc. The examples of digital interfaces may be DVI, HDMI, etc. In some embodiments, the exemplary inventive VIPM (201) may be configured to apply analog-to-digital conversion if the analog input signal is detected. In some embodiments, the exemplary inventive VIPM (201) may be configured to resize the input video frames to the resolution suitable for the face recognition and face tracking algorithms in other modules (e.g., 202-205). The examples of such lower resolutions may be 640×480 pixels, 800×600 pixels, etc. In some embodiments, an exemplary inventive Face Detection Module (202) may be configured to utilize one or more algorithms for face detection. The examples of such algorithms may be in one or more of U.S. patent application Ser. Nos. 15/881,353; 15/956,450; 15/962,347; 15/986,482; 16/015,055; and Ser. No. 16/034,267, hereby incorporated by reference herein; or any other suitable algorithm. When the exemplary inventive Face Detection Module (202) detects one or more faces, the exemplary inventive Face Detection Module (202) may be configured to transmit the detection data to an exemplary specifically programmed inventive Person Identification Module (203). In some embodiments, the exemplary specifically programmed inventive Person Identification Module (203) may be configured to extract vector(s) of features from each face box and compare the extracted vector(s) with those stored in an exemplary profile database (206). The example of such features may be the local binary features for IBUG-68 landmarks as described in Sh. Ren, X. Cao, Y. Wei, and J. Sun. Face alignment at 3000 fps via regressing local binary features. In Computer Vision and Pattern Recognition (CVPR), 2014 IEEE Conference on. IEEE, 2014.

In some embodiments, the exemplary specifically programmed inventive Person Identification Module (203) may be configured to utilize other suitable algorithms for facial feature extraction. In some embodiments, when the exemplary specifically programmed inventive Person Identification Module (203) determines a unique match between the data stored in the profile database (206) and the detected vector(s) of features, the exemplary specifically programmed inventive Person Identification Module (203) may be configured to add the new vector(s) of features to the existing ones.

In some embodiments, the exemplary structure of the exemplary inventive computing device that may be further programmed/configured to include an exemplary specifically programmed inventive Person Data Collection Module (204) which may be programmed/configured to combine data (e.g., set of vectors) for each person and generate input(s) into an exemplary specifically programmed inventive Emotion Classification Module (205).

In some embodiments, the exemplary specifically programmed inventive Emotion Classification Module (205) may be configured to utilize at least one algorithm based on the three-dimensional morphable face model (for example, without limitation, Huber, P., Hu, G., Tena, R., Mortazavian, P., Koppen, W., Christmas, W., Ratsch, M., and Kittler, J. A Multiresolution 3D morphable face model and fitting framework, 2015), which may take the feature vector(s) and reconstruct three-dimensional model(s) by fitting anthropometrics, facial expressions and/or other meta-parameters (e.g., light vector, etc.). In some embodiments, the exemplary specifically programmed inventive Emotion Classification Module (205) may be configured to determine facial expressions that may contain emotions which may be classified using predefined categories (e.g., joy, anger, happiness, etc.). For example, an exemplary inventive model may be trained in such a way as it shown in Table 1 and FIGS. 5-8. For example, Table 1 shows an exemplary Python pseudo code for the exemplary inventive Emotion Classification Module (205).

TABLE 1

Load data.
Process:
dataL = dataL − dataL[0]
expr_pow = np.tensordot(dataL, basis_pow, axes = (1, 1))
expr_pow = expr_pow.reshape(−1)
expr_pow[expr_pow < 0] = 0
expr_pow[expr_pow > 1] = 1
expr_pow = expr_pow.reshape(−1, 6)
expr_ax = np.zeros((dataL.shape[0], 6))
for i in range(dataL.shape[0]):
    for j in range(6):
        expr_ax[i, j] = np.sum(dataL[i] * basis_ax[j]) / np.sqrt(np.sum(dataL[i] * dataL[i]) * np.sum(basis_ax[j] * basis_ax[j]) + 0.001)
expr_ax = expr_ax.reshape(−1)
expr_ax[expr_ax < 0] = 0
expr_ax[expr_ax > 1] = 1
expr_ax = expr_ax.reshape(−1, 6)
Visualise.

Table 2 illustrates an exemplary configuration of an exemplary inventive neural network trained for the inventive emotion/mood classification.

TABLE 2

| Layer (type) | Output Shape | Param # | Connected to |
| --- | --- | --- | --- |
| input_4 (InputLayer) | (None, 64, 64, 1) | 0 | |
| conv1 (Conv2D) | (None, 64, 64, 64) | 1664 | input_4[0][0] |
| batch_normalization_139 (BatchN | (None, 64, 64, 64) | 256 | conv1_[01[0] |
| relu_conv1 (Activation) | (None, 64, 64, 64) | 0 | batch_normalization_139[0][0] |
| pool_1 (MaxPooling2D) | (None, 32, 32, 64) | 0 | relu_conv1_[0][0] |
| dropout_7 (Dropout) | (None, 32, 32, 64) | 0 | pool1_[0][0] |
| conv2d_89 (Conv2D) | (None, 32, 32, 32) | 2080 | dropout_7[0][0] |
| batch_normalization_140 (BatchN | (None, 32, 32, 32) | 128 | conv2d_89[0110] |
| activation_133 (Activation) | (None, 32, 32, 32) | 0 | batch_normalization_140[0][0] |
| depthwise_conv2d_45 (DepthwiseC | (None, 32, 32, 32) | 320 | activation_133[0][0] |
| depthwise_conv2d_46 (DepthwiseC | (None, 32, 32, 32) | 832 | activation_133[0][0] |
| batch_normalization_142 (BatchN | (None, 32, 32, 32) | 128 | depthwise_conv2d_45[0][0] |
| batch_normalization_144 (BatchN | (None, 32, 32, 32) | 128 | depthwise_conv2d_46[0][0] |
| activation_135 (Activation) | (None, 32, 32, 32) | 0 | batch_normalization_142[0][0] |
| activation_137 (Activation) | (None, 32, 32, 32) | 0 | batch_normalization_144[0][0] |
| conv2d_90 (Conv2D) | (None, 32, 32, 32) | 1056 | activation_133[0][0] |
| conv2d_91 (Conv2D) | (None, 32, 32, 64) | 2112 | activation_135[0][0] |
| conv2d_92 (Conv2D) | (None, 32, 32, 32) | 1056 | activation_137[0][0] |
| batch_normalization_141 (BatchN | (None, 32, 32, 32) | 128 | conv2d_90[0][0] |
| batch_normalization_143 (BatchN | (None, 32, 32, 64) | 256 | conv2d_91[0][0] |
| batch_normalization_145 (BatchN | (None, 32, 32, 32) | 128 | conv2d_92[0][0] |
| activation_134 (Activation) | (None, 32, 32, 32) | 0 | batch_normalization_141[0][0] |
| activation_136 (Activation) | (None, 32, 32, 64) | 0 | batch_normalization_143[0][0] |
| activation_138 (Activation) | (None, 32, 32, 32) | 0 | batch_normalization_145[0][0] |
| concatenate_23 (Concatenate) | (None, 32, 32, 128) | 0 | activation_134[0][0] activation_136[0][0] activation_138[0][0] |

TABLE 2-continued

| Layer (type) | Output Shape | Param # | Connected to |
|---|---|---|---|
| conv2d_93 (Conv2D) | (None, 32, 32, 32) | 4128 | concatenate_23[0][0] |
| batch_normalization_146 (BatchN | (None, 32, 32, 32) | 128 | conv2d_93[0][0] |
| activation_139 (Activation) | (None, 32, 32, 32) | 0 | batch_normalization_146[0][0] |
| depthwise_conv2d_47 (DepthwiseC | (None, 32, 32, 32) | 320 | activation_139[0][0] |
| depthwise_conv2d_48 (DepthwiseC | (None, 32, 32, 32) | 832 | activation_139[0][0] |
| batch_normalization_148 (BatchN | (None, 32, 32, 32) | 128 | depthwise_conv2d_47[0][0] |
| batch_normalization_150 (BatchN | (None, 32, 32, 32) | 128 | depthwise_conv2d_48[0][0] |
| activation_141 (Activation) | (None, 32, 32, 32) | 0 | batch_normalization_148[0][0] |
| activation_143 (Activation) | (None, 32, 32, 32) | 0 | batch_normalization_150[0][0] |
| conv2d_94 (Conv2D) | (None, 32, 32, 32) | 1056 | activation_139[0][0] |
| conv2d_95 (Conv2D) | (None, 32, 32, 64) | 2112 | activation_141[0][0] |
| conv2d_96 (Conv2D) | (None, 32, 32, 32) | 1056 | activation_143[0][0] |
| batch_normalization_147 (BatchN | (None, 32, 32, 32) | 128 | conv2d_94[0][0] |
| batch_normalization_149 (BatchN | (None, 32, 32, 64) | 256 | conv2d_95[0][0] |
| batch_normalization_151 (BatchN | (None, 32, 32, 32) | 128 | conv2d_96[0][0] |
| activation_140 (Activation) | (None, 32, 32, 32) | 0 | batch_normalization_147[0][0] |
| activation_142 (Activation) | (None, 32, 32, 64) | 0 | batch_normalization_149[0][0] |
| activation_144 (Activation) | (None, 32, 32, 32) | 0 | batch_normalization_151[0][0] |
| concatenate_24 (Concatenate) | (None, 32, 32, 128) | 0 | activation_140[0][0] activation_142[0][0] activation_144[0][0] |
| pool3 (MaxPooling2D) | (None, 16, 16, 128) | 0 | concatenate_24[0][0] |
| dropout_8 (Dropout) | (None, 16, 16, 128) | 0 | pool3[0][0] |
| conv2d_97 (Conv2D) | (None, 16, 16, 64) | 8256 | dropout_8[0][0] |
| batch_normalization_152 (BatchN | (None, 16, 16, 64) | 256 | conv2d_97[0][0] |
| activation_145 (Activation) | (None, 16, 16, 64) | 0 | batch_normalization_152[0][0] |
| depthwise_conv2d_49 (DepthwiseC | (None, 16, 16, 64) | 640 | activation_145[0][0] |
| depthwise_conv2d_50 (DepthwiseC | (None, 16, 16, 64) | 1664 | activation_145[0][0] |
| batch_normalization_154 (BatchN | (None, 16, 16, 64) | 256 | depthwise_conv2d_49[0][0] |
| batch_normalization_156 (BatchN | (None, 16, 16, 64) | 256 | depthwise_conv2d_50[0][0] |
| activation_147 (Activation) | (None, 16, 16, 64) | 0 | batch_normalization_154[0][0] |
| activation_149 (Activation) | (None, 16, 16, 64) | 0 | batch_normalization_156[0][0] |
| conv2d_98 (Conv2D) | (None, 16, 16, 64) | 4160 | activation_145[0][0] |
| conv2d_99 (Conv2D) | (None, 16, 16, 128) | 8320 | activation_147[0][0] |
| conv2d_100 (Conv2D) | (None, 16, 16, 64) | 4160 | activation_149[0][0] |
| batch_normalization_153 (BatchN | (None, 16, 16, 64) | 256 | conv2d_98[0][0] |
| batch_normalization_155 (BatchN | (None, 16, 16, 128) | 512 | conv2d_99[0][0] |
| batch_normalization_157 (BatchN | (None, 16, 16, 64) | 256 | conv2d_100[0][0] |
| activation_146 (Activation) | (None, 16, 16, 64) | 0 | batch_normalization_153[0][0] |
| activation_148 (Activation) | (None, 16, 16, 128) | 0 | batch_normalization_155[0][0] |
| activation_150 (Activation) | (None, 16, 16, 64) | 0 | batch_normalization_157[0][0] |
| concatenate_25 (Concatenate) | (None, 16, 16, 256) | 0 | activation_146[0][0] activation_148[0][0] activation_150[0][0] |
| conv2d_101 (Conv2D) | (None, 16, 16, 64) | 16448 | concatenate_25[0][0] |
| batch_normalization_158 (BatchN | (None, 16, 16, 64) | 256 | conv2d_101[0][0] |
| activation_151 (Activation) | (None, 16, 16, 64) | 0 | batch_normalization_158[0][0] |
| depthwise_conv2d_51 (DepthwiseC | (None, 16, 16, 64) | 640 | activation_151[0][0] |
| depthwise_conv2d_52 (DepthwiseC | (None, 16, 16, 64) | 1664 | activation_151[0][0] |
| batch_normalization_160 (BatchN | (None, 16, 16, 64) | 256 | depthwise_conv2d_51[0][0] |
| batch_normalization_162 (BatchN | (None, 16, 16, 64) | 256 | depthwise_conv2d_52[0][0] |
| activation_153 (Activation) | (None, 16, 16, 64) | 0 | batch_normalization_160[0][0] |
| activation_155 (Activation) | (None, 16, 16, 64) | 0 | batch_normalization_162[0][0] |
| conv2d_102 (Conv2D) | (None, 16, 16, 64) | 4160 | activation_151[0][0] |
| conv2d_103 (Conv2D) | (None, 16, 16, 128) | 8320 | activation_153[0][0] |
| conv2d_104 (Conv2D) | (None, 16, 16, 64) | 4160 | activation_155[0][0] |
| batch_normalization_159 (BatchN | (None, 16, 16, 64) | 256 | conv2d_102[0][0] |
| batch_normalization_161 (BatchN | (None, 16, 16, 128) | 512 | conv2d_103[0][0] |
| batch_normalization_163 (BatchN | (None, 16, 16, 64) | 256 | conv2d_104[0][0] |
| activation_152 (Activation) | (None, 16, 16, 64) | 0 | batch_normalization_159[0][0] |
| activation_154 (Activation) | (None, 16, 16, 128) | 0 | batch_normalization_161[0][0] |
| activation_156 (Activation) | (None, 16, 16, 64) | 0 | batch_normalization_163[0][0] |
| concatenate_26 (Concatenate) | (None, 16, 16, 256) | 0 | activation_152[0][0] activation_154[0][0] activation_156[0][0] |
| pool5 (MaxPooling2D) | (None, 8, 8, 256) | 0 | concatenate_26[0][0] |
| dropout_9 (Dropout) | (None, 8, 8, 256) | 0 | pool5[0][0] |
| conv2d_105 (Conv2D) | (None, 8, 8, 96) | 24672 | dropout_9[0][0] |
| batch_normalization_164 (BatchN | (None, 8, 8, 96) | 384 | conv2d_105[0][0] |
| activation_157 (Activation) | (None, 8, 8, 96) | 0 | batch_normalization_164[0][0] |
| depthwise_conv2d_53 (DepthwiseC | (None, 8, 8, 96) | 960 | activation_157[0][0] |
| depthwise_conv2d_54 (DepthwiseC | (None, 8, 8, 96) | 2496 | activation_157[0][0] |
| batch_normalization_166 (BatchN | (None, 8, 8, 96) | 384 | depthwise_conv2d_53[0][0] |
| batch_normalization_168 (BatchN | (None, 8, 8, 96) | 384 | depthwise_conv2d_54[0][0] |
| activation_159 (Activation) | (None, 8, 8, 96) | 0 | batch_normalization_166[0][0] |
| activation_161 (Activation) | (None, 8, 8, 96) | 0 | batch_normalization_168[0][0] |
| conv2d_106 (Conv2D) | (None, 8, 8, 96) | 9312 | activation_157[0][0] |
| conv2d_107 (Conv2D) | (None, 8, 8, 192) | 18624 | activation_159[0][0] |

TABLE 2-continued

| Layer (type) | Output Shape | Param # | Connected to |
|---|---|---|---|
| conv2d_108 (Conv2D) | (None, 8, 8, 96) | 9312 | activation_161[0][0] |
| batch_normalization_165 (BatchN | (None, 8, 8, 96) | 384 | conv2d_106[0][0] |
| batch_normalization_167 (BatchN | (None, 8, 8, 192) | 768 | conv2d_107[0][0] |
| batch_normalization_169 (BatchN | (None, 8, 8, 96) | 384 | conv2d_108[0][0] |
| activation_158 (Activation) | (None, 8, 8, 96) | 0 | batch_normalization_165[0][0] |
| activation_160 (Activation) | (None, 8, 8, 192) | 0 | batch_normalization_167[0][0] |
| activation_162 (Activation) | (None, 8, 8, 96) | 0 | batch_normalization_169[0][0] |
| concatenate_27 (Concatenate) | (None, 8, 8, 384) | 0 | activation_158[0][0] activation_160[0][0] activation_162[0][0] |
| conv2d_109 (Conv2D) | (None, 8, 8, 96) | 36960 | concatenate_27[0][0] |
| batch_normalization_170 (BatchN | (None, 8, 8, 96) | 384 | conv2d_109[0][0] |
| activation_163 (Activation) | (None, 8, 8, 96) | 0 | batch_normalization_170[0][0] |
| depthwise_conv2d_55 (DepthwiseC | (None, 8, 8, 96) | 960 | activation_163[0][0] |
| depthwise_conv2d_56 (DepthwiseC | (None, 8, 8, 96) | 2496 | activation_163[0][0] |
| batch_normalization_172 (BatchN | (None, 8, 8, 96) | 384 | depthwise_conv2d_55[0][0] |
| batch_normalization_174 (BatchN | (None, 8, 8, 96) | 384 | depthwise_conv2d_56[0][0] |
| activation_165 (Activation) | (None, 8, 8, 96) | 0 | batch_normalization_172[0][0] |
| activation_167 (Activation) | (None, 8, 8, 96) | 0 | batch_normalization_174[0][0] |
| conv2d_110 (Conv2D) | (None, 8, 8, 96) | 9312 | activation_163[0][0] |
| conv2d_111 (Conv2D) | (None, 8, 8, 192) | 18624 | activation_165[0][0] |
| conv2d_112 (Conv2D) | (None, 8, 8, 96) | 9312 | activation_167[0][0] |
| batch_normalization_171 (BatchN | (None, 8, 8, 96) | 384 | conv2d_110[0][0] |
| batch_normalization_173 (BatchN | (None, 8, 8, 192) | 768 | conv2d_111[0][0] |
| batch_normalization_175 (BatchN | (None, 8, 8, 96) | 384 | conv2d_112[0][0] |
| activation_164 (Activation) | (None, 8, 8, 96) | 0 | batch_normalization_171[0][0] |
| activation_166 (Activation) | (None, 8, 8, 192) | 0 | batch_normalization_173[0][0] |
| activation_168 (Activation) | (None, 8, 8, 96) | 0 | batch_normalization_175[0][0] |
| concatenate_28 (Concatenate) | (None, 8, 8, 384) | 0 | activation_164[0][0] activation_166[0][0] activation_168[0][0] |
| drop9 (Dropout) | (None, 8, 8, 384) | 0 | concatenate_28[0][0] |
| conv10 (Conv2D) | (None, 8, 8, 8) | 3080 | drop9[0][0] |
| batch_normalization_176 (BatchN | (None, 8, 8, 8) | 32 | conv10[0][0] |
| relu_conv10 (Activation) | (None, 8, 8, 8) | 0 | batch_normalization_176[0][0] |
| global_average_pooling2d_4 (Glo | (None, 8) | 0 | relu_conv10[0][0] |
| loss (Activation) | (None, 8) | 0 | global_average_pooling2d_4[0][0] |

Total params: 238,376
Trainable params: 232,856
Non-trainable params: 5,520

In some embodiments, the exemplary specifically programmed inventive Emotion Classification Module (205) may be configured to utilize an additional machine-learning algorithm (e.g., logistic regression, random forest, etc.). In some embodiments, as shown in Table 2, the exemplary specifically programmed inventive Emotion Classification Module (205) may be configured apply one or more trained neural networks for emotion/mood classification (e.g., based at least in part on Correa, E., Jonker, A., Ozo, M., Stolk, R. Emotion recognition using deep convolutional neural networks, 2016).

In some embodiments, the exemplary specifically programmed inventive Emotion Classification Module (205) may be configured to use the sequence of the feature vectors stored in the profile database (206) in order to increase an accuracy of the emotion prediction. For example, the database (206) could store the features attributed to users who have been already identified. For example, the exemplary profile database (206) may store the reference emotions and "neutral face" for a particular user, as it shown in FIGS. 7 and 8. In some embodiments, maintaining the exemplary profile database (206) may allow to minimize errors during the real-time detection of the "neutral face." For example, the more times, the inventive system estimates the "neutral face", the better averaged estimation.

In some embodiments, the exemplary specifically programmed inventive Emotion Classification Module (205) may be configured to use previously saved information (e.g., anthropometric variables, reference emotions, etc.) of a particular individual and/or a group of individuals for more accurate fitting with a three-dimensional morphable face model, resulting in an improved accuracy of the prediction of facial expressions. For example, the exemplary specifically programmed inventive Emotion Classification Module (205) may be configured to use reference faces, shown in FIG. 8, that may be stored in the exemplary profile database (206). For example, in some embodiments, the instant invention may utilize 10 to 30 variables in the Principal Components Analysis (PCA) space which defines anthropometric coefficients as, without limitation, attributes of a particular face. The example, the exemplary specifically programmed inventive Emotion Classification Module (205) may be configured to use such PCA variables for the "neutral face" that may be: 0.999566; −0.0280383; −0.00900668; 0.000625245; 0.139746; −0.47811; 0.616161; −0.00300746; −0.00226436; 0.000932518; 0.00379858; 0.000198183; −9.94794e-05; −0.00286826; 0.999983; −0.00585693; 0; 0; 0; −3.03977; 1.94081; 0.485426; −1.77449; 1.05898; 0.263982; 0.648144; −1.97615; 0.315616; 0.820674; −0.265365; 1.61812; 0.030586; 1.15689; 0.50181; 0.828738; −1.98846; −0.353466; −0.00253709; −0.374079; 1.30723; 1.51541; −0.258712; −0.765999; 0.866264; 0.444861; −0.0226986; 0.184823; 0.254175; and 0.394272. For example, in some embodiments, the instant invention may utilize 5 to 50 variables in the PCA space. For example, in some embodiments, the instant invention may utilize 5 to 100 variables in the PCA space. For example, in some embodiments, the instant invention may utilize 10 to 100 variables in the PCA space. For example, in some embodiments, the instant invention may utilize at least 10 variables in the PCA space.

Referring now to FIG. 2B which illustrates another exemplary structure of the exemplary inventive computing device that may be programmed/configured for emotion detection and recognition in accordance with at least some embodiments of the present invention. For example, video frames from a mobile device camera may be received/obtained by the Face recognition module (211) which may include one or several face detection algorithms. In some embodiments, the examples of such algorithms may be one or more algorithms detailed in one or more of U.S. patent application Ser. Nos. 15/881,353; 15/956,450; 15/962,347; 15/986,482; 16/015,055; and Ser. No. 16/034,267; incorporated hereby by reference herein for such specific purpose; or any other suitable algorithm. In some embodiments, the Face recognition module (211) may also include one or several face alignment and morphable three-dimensional face model algorithms (for example, without limitation, Huber, P., Hu, G., Tena, R., Mortazavian, P., Koppen, W., Christmas, W., Ratsch, M., and Kittler, J. A Multiresolution 3D morphable face model and fitting framework, 2015). In some embodiments, the face model may be trained on the Server (214) using a suitable synthetic face database such as, without limitation, one or more of FaceGen library (facegen.com) by Singular Inversions Inc. (Toronto, Calif.), a dataset generated using Unity 3D engine (Unity Technologies ApS, San Francisco, Calif.), and Blender library (by Nathan Miller, The Proving Ground). In some embodiments, the Emotion detection module (212) may be configured/programmed to perform as described above regarding the exemplary inventive module (205) of FIG. 2A. In some embodiments, the exemplary inventive modules (211) and (212) may be based on one or more inventive neural networks, as detailed herein.

Figure 9:
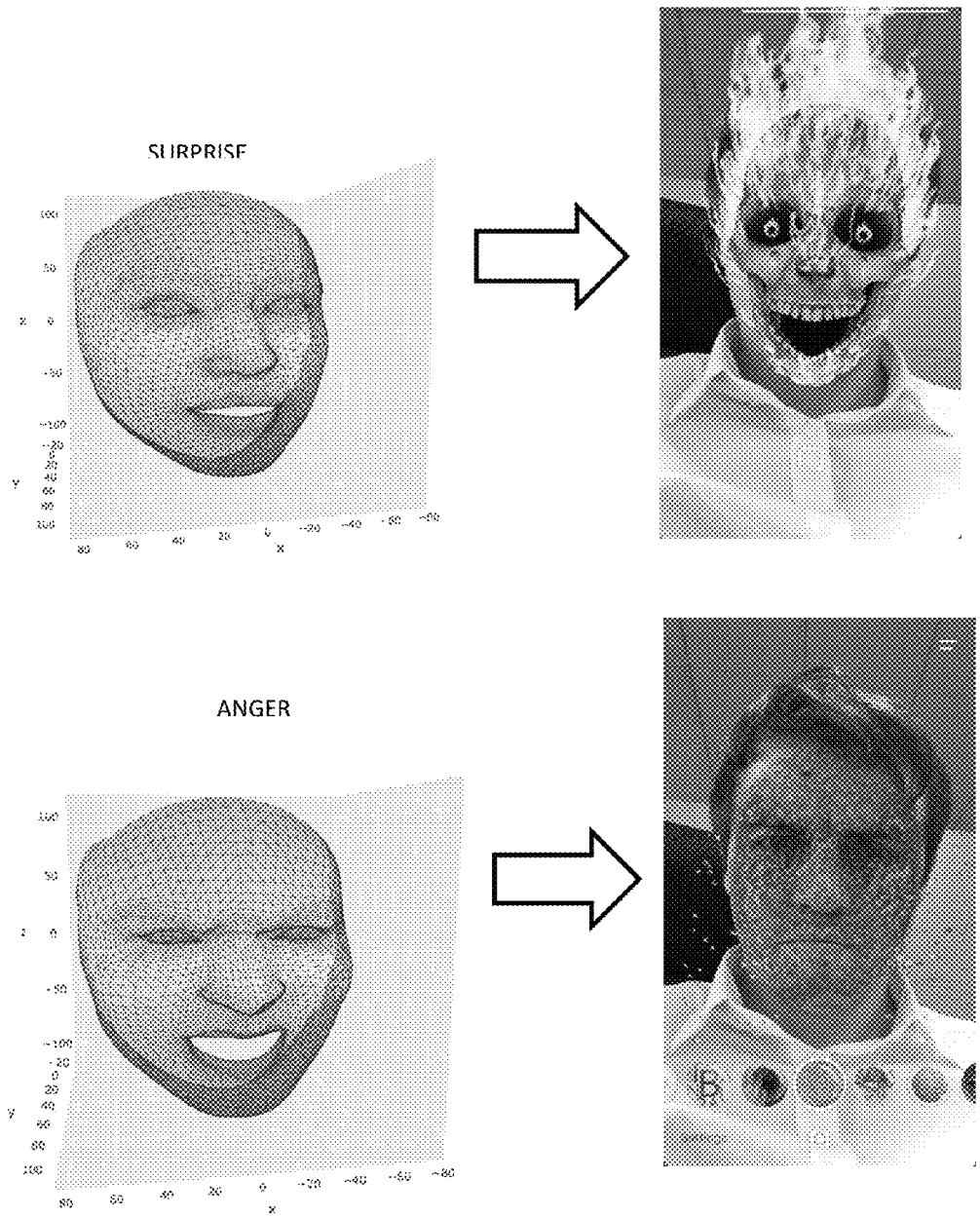

In some embodiments, the exemplary inventive Emotion-to-content mapping module (213) may be configured to cause to perform one or more activities by, for example without limitation, utilizing any suitable mapping algorithm to match/map/associate emotions with one or more elements of the electronic content (e.g., visual masks, visual filters, visual effects, artificial backgrounds, elements of user's digital experience (UX), emojis, etc.) and then perform or cause to perform certain activities based on matched content (e.g., generate recommendation, learning task, etc.). In some embodiments, illustrative mapping algorithms programmed into the exemplary inventive Emotion-to-content mapping module (213) may be at least one of clustering, tabular functions, machine learning, recommendation engines, or similarly suitable other techniques. In some embodiments, the recommended content may include at least one of visual effect(s), visual mask(s), visual filter(s), or similar visual appearance change(s) to be apply to the visual input/output. For example, FIG. 9 illustrates results of recommended visual transformation based on estimated emotional state of a person. For example, an exemplary inventive recommendation engine may be programmed to utilize to at least one of:
i) predetermined associations between particular emotions and, for example, particular visual effects, or
ii) Collaborative Filtering (CF) detailed, for example without limitation, in Su et al., A survey of collaborative filtering techniques, Advances in Artificial Intelligence archive, 2009.

Figure 3:
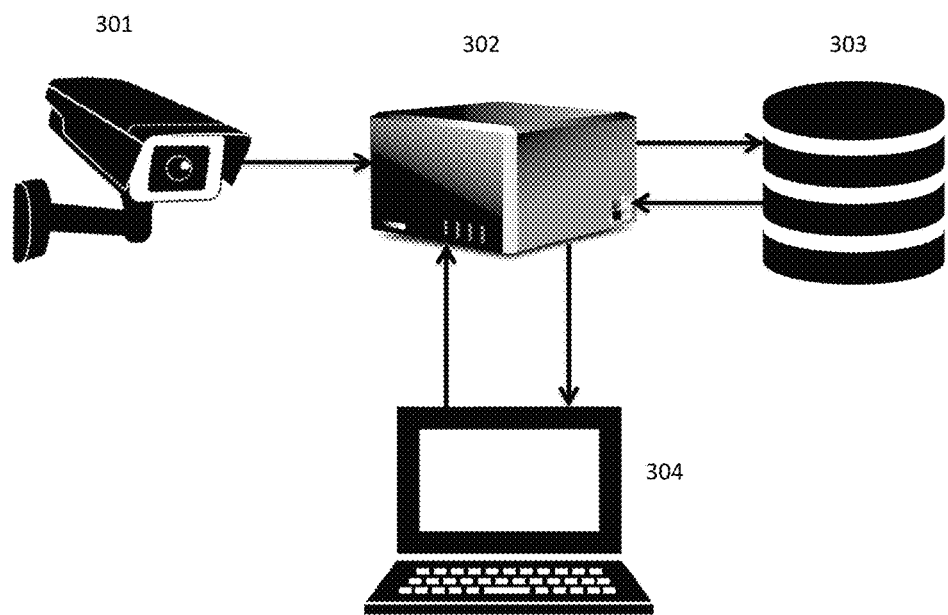

FIG. 3 illustrates an exemplary environment incorporating certain embodiments of the present invention. For example, the exemplary inventive environment may include a CCTV camera (301), which may be any camera that can send analog or digital video signal to a storage or processing device. An exemplary processing engine/block (302) may include one ore or more inventive modules (201-205) and may be connected to and/or controlled by a centralized computer (304) which may be any type of computers, including laptops, servers, stationary desktops, mobile devices, and suitable others. An exemplary storage (303) may be any storage device suitable for accessing data detailed herein.

Figure 4:
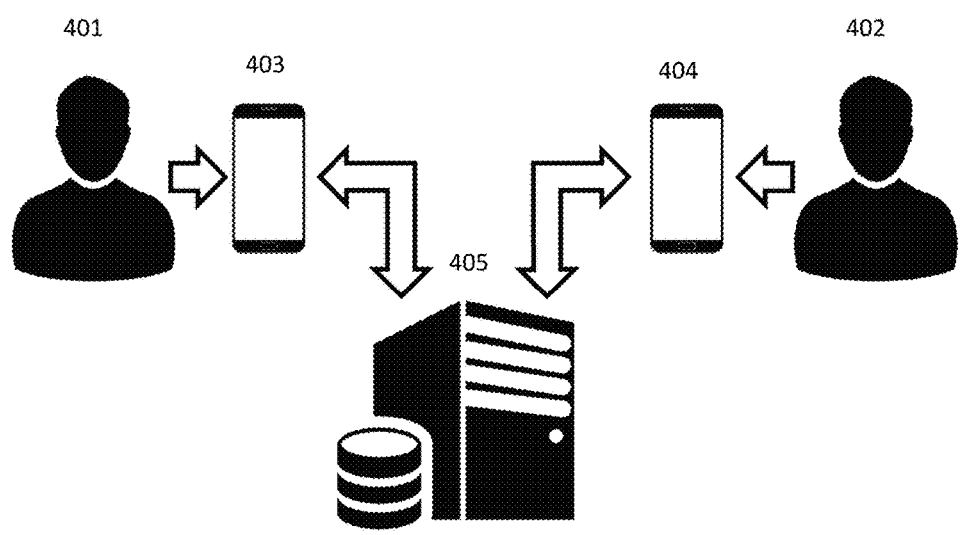

FIG. 4 illustrates another exemplary environment incorporating certain embodiments of the present invention. For example, the exemplary inventive environment of FIG. 4 may be configured so that a user (401) may communicate with a user (402) via mobile devices (403) and (404). Further, as for example detailed in FIG. 5, at least one exemplary inventive server (405) may be configured/programmed to dynamically process information received from the mobile devices (403) and (404), train inventive machine-leaning, deep-learning and/or other similarly suitable models, and update electronic content.

In some embodiments, the inventive methods and the inventive systems of the present inventions can be incorporated, partially or entirely into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the exemplary computer engine system may be configured such that its members may communicate via one or more radios modules capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, one or more radios modules may operate in accordance with one or more applicable standards in any version.

In various implementations, a final output of the present invention may be displayed on a screen which may include any television type monitor or display, or mobile device display. In various implementations, the display may include, for example, a computer display screen, mobile device screen, touch screen display, video monitor, television-like device, and/or a television. In various implementations, the display may be digital and/or analog. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

Further, in some embodiments, the exemplary inventive computing device may be utilized for various applications which may include, but not limited to, gaming, mobile-device games, video chats, video conferences, live video streaming, video streaming and/or augmented reality applications, mobile-device messenger applications, and others similarly suitable computer-device applications.

In some embodiments, the present invention provides for an exemplary computer-implemented method that may include at least the following steps of: obtaining, by at least one processor, a visual input having a face of at least one person; where the visual input includes at least one video frame, at least one image, or both; applying, by the at least one processor, at least one face detection algorithm to detect a presence of the face of the at least one person within the visual input; extracting, by the at least one processor, a vector of at least one feature of the face of the at least one person from the presence of the face within the visual input; matching, by the at least one processor, the vector of the at least one feature of the face of the at least one person to at least one stored profile of the at least one person to identify the at least one person; where the at least one stored profile of the at least one person is stored in at least one profile database having a plurality of profiles of a plurality of persons; where each respective profile of each respective person in the at least one profile database includes each respective plurality of vectors corresponding to each respective plurality of features; fitting, by the at least one processor, based at least in part on a plurality of person-specific meta-parameters, at least one three-dimensional morphable face model (3DMFM) to obtain a person-specific 3DMFM of the at least one person; where the plurality of person-specific meta-parameters corresponds to a particular plurality of vectors corresponding to a particular plurality of features of the at least one person; applying, by the at least one processor, at least one facial expression detection algorithm to the person-specific 3DMFM of the at least one person to determine at least one person-specific facial expression of the at least one person; where the at least one facial expression detection algorithm has been trained to determine a plurality of facial expressions based at least in part on a plurality of predefined categories; and causing, by the at least one processor, to perform at least one activity associated with the at least one person based at least in part on the at least one person-specific facial expression of the at least one person.

In some embodiments, the causing to perform the at least one activity associated with the at least one person further including: associating, by the at least one processor, the at least one person-specific facial expression of the at least one person with at least one element of an electronic content.

In some embodiments, the electronic content is a recommended content that is provided to the at least one person.

In some embodiments, the recommended content is at least one of: i) at least one visual effect, ii) at least one visual mask, or iii) at least one visual filter.

In some embodiments, the exemplary method may further include updating, by the at least one processor, the particular plurality of vectors of the corresponding particular plurality of features in the at least one stored profile of the at least one person based on the person-specific 3DMFM of the at least one person.

In some embodiments, the exemplary method may further include adding at least one new vector of at least one new corresponding feature of the at least one person to the particular plurality of vectors of the corresponding particular plurality of features in the at least one stored profile of the at least one person.

In some embodiments, the exemplary method may further include modifying at least one stored vector of a corresponding particular feature of the at least one person in the at least one stored profile of the at least one person.

In some embodiments, the at least one feature is based on one or more landmarks.

In some embodiments, the plurality of predefined categories is based at least in part on a Facial Action Coding System (FACS).

In some embodiments, the plurality of predefined categories is based at least in part on each respective threshold level for each respective facial expression coefficient of a plurality of facial expression coefficients.

In some embodiments, the visual input has a lower resolution and has been obtained from at least one of: i) at least one CCTV camera, ii) at least one computer camera having a associated with a desktop computer, iii) at least one computer camera associated with at least one mobile computer, or iv) at least one computer camera associated with at least one smartphone.

In some embodiments, the present invention provides for an exemplary system that may include at least the following components: a camera component, where the camera component is configured to acquire a visual input, where the visual input includes a face of at least one person; at least one processor; a non-transitory computer memory, storing a computer program that, when executed by the at least one processor, causes the at least one processor to: obtain the visual input having the face of the at least one person; where the visual input includes at least one video frame, at least one image, or both; apply at least one face detection algorithm to detect a presence of the face of the at least one person within the visual input; extract a vector of at least one feature of the face of the at least one person from the presence of the face within the visual input; match the vector of the at least one feature of the face of the at least one person to at least one stored profile of the at least one person to identify the at least one person; where the at least one stored profile of the at least one person is stored in at least one profile database having a plurality of profiles of a plurality of persons; where each respective profile of each respective person in the at least one profile database includes each respective plurality of vectors corresponding to each respective plurality of features; fit, based at least in part on a plurality of person-specific meta-parameters, at least one three-dimensional morphable face model (3DMFM) to obtain a person-specific 3DMFM of the at least one person; where the plurality of person-specific meta-parameters corresponds to a particular plurality of vectors corresponding to a particular plurality of features of the at least one person; apply at least one facial expression detection algorithm to the person-specific 3DMFM of the at least one person to determine at least one person-specific facial expression of the at least one person; where the at least one facial expression detection algorithm has been trained to determine a plurality of facial expressions based at least in part on a plurality of predefined categories; and cause to perform at least one activity associated with the at least one person based at least in part on the at least one person-specific facial expression of the at least one person.

A person skilled in the art would understand that, without violating the principles of the present invention detailed herein, in some embodiments, the exemplary illustrative methods and the exemplary illustrative systems of the present invention can be specifically configured to be utilized in any combination with one or more techniques, methodologies, and/or systems detailed in one or more of U.S. patent application Ser. Nos. 15/881,353; 15/956,450; 15/962,347; 15/986,482; 16/015,055; and Ser. No. 16/034,267, each of such specific disclosures is incorporated herein by reference in its entirety for such purpose.

Publications cited throughout this document are hereby incorporated by reference in their entirety. While a number of embodiments of the present invention have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:

1. A computer-implemented method, comprising:
    obtaining, by at least one processor, a visual input having a face of at least one person;
    wherein the visual input comprises at least one video frame, at least one image, or both;
    applying, by the at least one processor, at least one face detection algorithm to detect a presence of the face of the at least one person within the visual input;
    extracting, by the at least one processor, a vector of at least one feature of the face of the at least one person from the presence of the face within the visual input;
    matching, by the at least one processor, the vector of the at least one feature of the face of the at least one person to at least one stored profile of the at least one person to identify the at least one person;
    wherein the at least one stored profile of the at least one person is stored in at least one profile database having a plurality of profiles of a plurality of persons;
    wherein each respective profile of each respective person in the at least one profile database comprises each respective plurality of vectors corresponding to each respective plurality of features;
    fitting, by the at least one processor, based at least in part on a plurality of person-specific meta-parameters, at least one three-dimensional morphable face model (3DMFM) to obtain a person-specific 3DMFM of the at least one person;
    wherein the plurality of person-specific meta-parameters corresponds to a particular plurality of vectors corresponding to a particular plurality of features of the at least one person;
    applying, by the at least one processor, at least one facial expression detection algorithm to the person-specific 3DMFM of the at least one person to determine at least one person-specific facial expression of the at least one person;
    wherein the at least one facial expression detection algorithm has been trained to determine a plurality of facial expressions based at least in part on a plurality of predefined categories; and
    causing, by the at least one processor, to perform at least one activity associated with the at least one person based at least in part on the at least one person-specific facial expression of the at least one person.

2. The method of claim 1, wherein the causing to perform the at least one activity associated with the at least one person further comprising:
    associating, by the at least one processor, the at least one person-specific facial expression of the at least one person with at least one element of an electronic content.

3. The method of claim 2, wherein the electronic content is a recommended content that is provided to the at least one person.

4. The method of claim 3, wherein the recommended content is at least one of:
    i) at least one visual effect,
    ii) at least one visual mask, or
    iii) at least one visual filter.

5. The method of claim 1, further comprising:
    updating, by the at least one processor, the particular plurality of vectors of the corresponding particular plurality of features in the at least one stored profile of the at least one person based on the person-specific 3DMFM of the at least one person.

6. The method of claim 5, wherein the updating the particular plurality of vectors of the corresponding particular plurality of features in the at least one stored profile of the at least one person, comprising:
    adding at least one new vector of at least one new corresponding feature of the at least one person to the particular plurality of vectors of the corresponding particular plurality of features in the at least one stored profile of the at least one person.

7. The method of claim 5, wherein the updating the particular plurality of vectors of the corresponding particular plurality of features in the at least one stored profile of the at least one person, comprising:
    modifying at least one stored vector of a corresponding particular feature of the at least one person in the at least one stored profile of the at least one person.

8. The method of claim 1, wherein the at least one feature is based on one or more landmarks.

9. The method of claim 1, wherein the plurality of predefined categories is based at least in part on a Facial Action Coding System (FACS).

10. The method of claim 1, wherein the plurality of predefined categories is based at least in part on each respective threshold level for each respective facial expression coefficient of a plurality of facial expression coefficients.

11. The method of claim 1, wherein the visual input has a lower resolution and has been obtained from at least one of:
    i) at least one CCTV camera,
    ii) at least one computer camera having a associated with a desktop computer,
    iii) at least one computer camera associated with at least one mobile computer, or
    iv) at least one computer camera associated with at least one smartphone.

12. A system, comprising:
    a camera component, wherein the camera component is configured to acquire a visual input, wherein the visual input comprises a face of at least one person;
    at least one processor;
    a non-transitory computer memory, storing a computer program that, when executed by the at least one processor, causes the at least one processor to:
        obtain the visual input having the face of the at least one person;
        wherein the visual input comprises at least one video frame, at least one image, or both;
        apply at least one face detection algorithm to detect a presence of the face of the at least one person within the visual input;
        extract a vector of at least one feature of the face of the at least one person from the presence of the face within the visual input;
        match the vector of the at least one feature of the face of the at least one person to at least one stored profile of the at least one person to identify the at least one person;

wherein the at least one stored profile of the at least one person is stored in at least one profile database having a plurality of profiles of a plurality of persons;

wherein each respective profile of each respective person in the at least one profile database comprises each respective plurality of vectors corresponding to each respective plurality of features;

fit, based at least in part on a plurality of person-specific meta-parameters, at least one three-dimensional morphable face model (3DMFM) to obtain a person-specific 3DMFM of the at least one person;

wherein the plurality of person-specific meta-parameters corresponds to a particular plurality of vectors corresponding to a particular plurality of features of the at least one person;

apply at least one facial expression detection algorithm to the person-specific 3DMFM of the at least one person to determine at least one person-specific facial expression of the at least one person;

wherein the at least one facial expression detection algorithm has been trained to determine a plurality of facial expressions based at least in part on a plurality of predefined categories; and cause to perform at least one activity associated with the at least one person based at least in part on the at least one person-specific facial expression of the at least one person.

13. The system of claim 12, wherein, when executed by the at least one processor, the computer program further causes the at least one processor to:

associate the at least one person-specific facial expression of the at least one person with at least one element of an electronic content.

14. The system of claim 13, wherein the electronic content is a recommended content that is provided to the at least one person.

15. The system of claim 14, wherein the recommended content is at least one of:
i) at least one visual effect,
ii) at least one visual mask, or
iii) at least one visual filter.

16. The system of claim 12, wherein, when executed by the at least one processor, the computer program further causes the at least one processor to:
update the particular plurality of vectors of the corresponding particular plurality of features in the at least one stored profile of the at least one person based on the person-specific 3DMFM of the at least one person.

17. The system of claim 16, wherein, when executed by the at least one processor, the computer program further causes the at least one processor to:
add at least one new vector of at least one new corresponding feature of the at least one person to the particular plurality of vectors of the corresponding particular plurality of features in the at least one stored profile of the at least one person.

18. The system of claim 16, wherein, when executed by the at least one processor, the computer program further causes the at least one processor to:
modify at least one stored vector of a corresponding particular feature of the at least one person in the at least one stored profile of the at least one person.

19. The system of claim 12, wherein the at least one feature is based on one or more landmarks.

20. The system of claim 12, wherein the plurality of predefined categories is based at least in part on a Facial Action Coding System (FACS).

21. The system of claim 12, wherein the plurality of predefined categories is based at least in part on each respective threshold level for each respective facial expression coefficient of a plurality of facial expression coefficients.

22. The system of claim 12, wherein the visual input has a lower resolution and has been obtained from at least one of:
i) at least one CCTV camera,
ii) at least one computer camera having a associated with a desktop computer,
iii) at least one computer camera associated with at least one mobile computer, or
iv) at least one computer camera associated with at least one smartphone.

* * * * *